United States Patent
Oksanen

(10) Patent No.: US 6,724,997 B2
(45) Date of Patent: Apr. 20, 2004

(54) DISPERSION COMPENSATION IN OPTICAL COMMUNICATION NETWORK AND OPTICAL COMMUNICATION NETWORK

(75) Inventor: Markku Oksanen, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/956,735

(22) Filed: Sep. 11, 2001

(65) Prior Publication Data

US 2002/0012148 A1 Jan. 31, 2002

Related U.S. Application Data

(63) Continuation of application No. PCT/FI00/00151, filed on Feb. 24, 2000.

(30) Foreign Application Priority Data

Dec. 3, 1999 (FI) .................................................. 990547

(51) Int. Cl.[7] .......................... H04B 10/12; H04J 14/02
(52) U.S. Cl. ........................................ 398/150; 398/81
(58) Field of Search .......................... 385/122; 359/161, 359/124; 398/147, 150, 81

(56) References Cited

U.S. PATENT DOCUMENTS

| 5,751,454 A | 5/1998 | MacDonald et al. |
|---|---|---|
| 5,760,934 A | 6/1998 | Sutter et al. |
| 5,777,770 A | 7/1998 | Naito |
| 5,815,490 A * | 9/1998 | Lu .............................. 370/223 |
| 5,920,588 A * | 7/1999 | Watanabe .................... 359/124 |
| 6,307,984 B1 * | 10/2001 | Watanabe .................... 359/174 |

FOREIGN PATENT DOCUMENTS

| EP | 0703680 A2 | 3/1996 |
|---|---|---|
| EP | 0708538 A2 | 4/1996 |
| EP | 0801452 A2 | 10/1997 |
| EP | 0862078 A1 | 9/1998 |

* cited by examiner

Primary Examiner—Leslie Pascal
Assistant Examiner—Shi K. Li
(74) Attorney, Agent, or Firm—Squire, Sanders & Dempsey L.L.P.

(57) ABSTRACT

The invention relates to a method for compensating signal dispersion in an optical communication network and to an optical communication network. The dispersion compensation is carried out by constructing the network in such a way that a route having an even number of phase conjugating means can be found between any two nodes. The routing is primarily made along a route in which there is the minimum even number of phase conjugating means between the terminal nodes. A preferred embodiment of the invention is a ring network constructed of two concentric rings in such a way that both rings comprise the same node points, but the number of phase conjugating means to be installed in said rings, in the optical fibers between adjacent nodes is, for example, even in the outer ring and odd in the inner ring.

6 Claims, 1 Drawing Sheet

Figure 1:
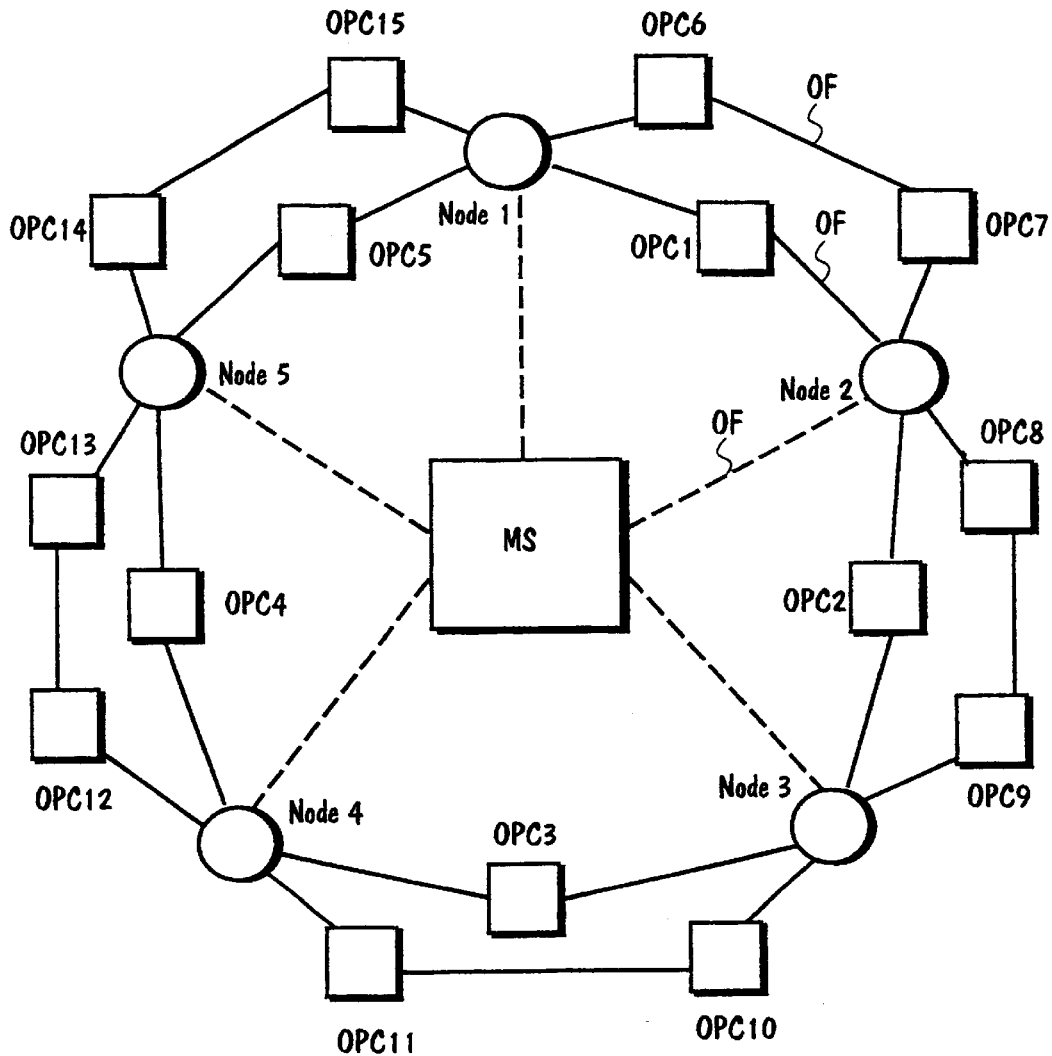

DISPERSION COMPENSATION IN OPTICAL COMMUNICATION NETWORK AND OPTICAL COMMUNICATION NETWORK

This is a continuation of Application No. PCT/FI00/00151, filed Feb. 24, 2000.

FIELD OF THE INVENTION

The invention relates generally to dispersion compensation carried out by phase conjugation and to an optical communication network implemented with phase conjugating means.

BACKGROUND OF THE INVENTION

In optical transmission systems, an optical signal is modulated with an outbound data stream, and the modulated optical signal is applied to optical fiber. The capacity of the transmission system can be increased in two different ways: by increasing the bandwidth of the data stream or by introducing more wavelengths to be transported in the fiber. The latter alternative is effectively implemented with wavelength division multiplexing (WDM). At the moment, a typical wave range in optical communication is the 1550 nm window. The light to be transmitted is coherent light, that is, the optical signal to be transmitted comprises only a given frequency spectrum having a regular pattern. The most significant properties of the components at the transmitting end of optical fiber include, in addition to the optical power, the breadth of the spectrum generated and the degree of modulation of the signal to be transmitted. The quality and configuration of the components employed is dependent on the purpose of use. Essential components in wavelength division multiplexing include lasers and filters operating at a precise optical wavelength. The window employed determines what kind of laser will be the most suitable for the system to be implemented. The transmitting end of the optical signal has an optical transmitter, usually a laser suitable for that purpose, for generating a coherent photo signal. The receiving end of the fiber has an optical receiver, for example an avalanche photo diode (APD) or a PIN diode which is simpler than an APD.

Various topologies for an optical network can be constructed by concatenating optical links. One such network topology is a network that is physically a ring but logically a mesh (in other words, a connection can be established between any two nodes of the ring). Physically, the optical fiber is connected from node to node (N nodes) to form a ring-shaped structure. There may be more than one optical fiber, and several signals at different wavelengths ($\lambda_1, \lambda_2 \ldots \lambda_N$) may pass in each fiber. Special cases of a ring include a single-fiber ring and a twin-fiber ring. In a single-fiber ring, the signals normally pass in one direction in the fiber, either clockwise or counterclockwise. It is also possible to realize bidirectional traffic in the same fiber. In the case of bidirectional traffic, normally each different wavelength can utilize only one direction in a single link. As a result, in the link between two neighbouring nodes the connection can be set up along the shortest route via a direct link in one direction only, whereas in the connection in the reverse direction the signals must pass along the longer route along the ring. In a twin-fiber ring, the above problem does not appear, since a connection can be established between the pairs of nodes in two different rotating directions. The signals then pass in two fibers in reverse rotating directions, as a rule primarily using the shorter connection. The longer routes exist as redundancy for error situations. For example, if the cable between the nodes concerned is damaged, the connection will not necessarily be cut off, since the longer route can be taken into use.

A commonly used ring network is what is known as the full connection symmetric ring. The ring consists of N network node points and optical fibers between the nodes. In this case, each node has one incoming optical fiber and one outgoing optical fiber. Hence, the ring network is a single-fiber ring in which bidirectional connections are established between all different pairs of nodes in one rotating direction, either clockwise or counterclockwise.

The type of the signal employed in the network can vary; the signal may be e.g. an SDH (Synchronous Digital Hierarchy) or a PDH (Plesiochronous Digital Hierarchy) signal.

The most significant phenomena affecting the signal propagation in optical communication are attenuation and dispersion. With the increase in the number of nodes in the network, also the attenuation increases. When necessary, a linear optical fiber amplifier (OFA), wherewith all different wave lengths passing in the fiber can be amplified simultaneously, can be employed in connection with WDH technology. Optical signals of different frequencies travel at different rates in the fiber, and dispersion is always generated in the fiber. Signal dispersion is one of the factors limiting the size of the ring. There are different implementations for dispersion compensation, perhaps the most widely used being dispersion compensating fibers (DCF) and chirped fiber Bragg gratings. In such a grating, the period of the grating varies linearly as a function of position, the consequence of which is that the grating reflects different wavelengths from different points and thus causes various delays at different frequencies. Dispersion compensating fibers offer negative dispersion in the 1550 nm wave range. The drawback of these fibers is their attenuation-increasing effect. A phase conjugator can also be used for dispersion compensation in optical fiber; the phase conjugator is installed in the system by simply placing it substantially midway the optical fiber with regard to the length of the fiber. Thus, the installation does not require special adjustment or tuning operations. An optical phase conjugator is a device that inverts the spectrum, i.e., performs a frequency shift on the wavelengths arriving at the device by mirroring the incoming wavelength relative to a given mirror wavelength. As a result, each wavelength that has passed through the phase conjugating means has been mirrored in the device in such a way that it is at equal distance from the mirror wavelength as upon arrival at the device, but on the reverse side of the mirror wavelength. The number of phase conjugating means can vary in the network among the different nodes. Thus, for example a receiving node can receive a signal including several different WDM wavelengths, mirrored relative to a given mirror wavelength in such a way that the low and high frequencies are in inverse order compared to the original signal, but on the other hand also a signal that is similar to the original signal from the transmitting node. In such a situation, the receiving node must somehow know how it is to detect incoming signals, since the signals can be either similar to the original signal or mirror images of the original signal. The object of the invention is to remedy the above drawback, so that the receiving node need not know the order of the incoming wavelengths.

SUMMARY OF THE INVENTION

The invention relates to dispersion compensation carried out by phase conjugation in an optical communication network. The basic idea of the invention is to implement dispersion compensation in an optical communication network with phase conjugating means in such a way that a route having an even number of phase conjugating means can be found between any two nodes, the result being that the spectrum inversion caused by said means will not present any problems. The set object is achieved in the way disclosed in the independent claim.

A preferred embodiment of the invention is a ring network constructed of two concentric rings in such a way that both rings comprise the same node points, but the number of phase conjugating means to be installed in said rings, in the optical fibers between adjacent nodes is, for example, even in the outer ring and odd in the inner ring. The phase conjugating means can naturally also be installed in the network in a variety of other ways. However, what is essential to the invention is that a signal transmitted from any node in the network can be routed to any other node in such a way that the signal to be transported travels a route in which the total number of phase conjugating means is even, yet so that the signal is primarily routed along a route in which there is the minimum even number of phase conjugating means in said network. However, the solution in accordance with the invention is not limited to a ring network, but the network can naturally have any shape other than a ring, as long as it meets the above condition set on the phase conjugating means.

The solution in accordance with the invention affords two advantages: 1) signal dispersion is compensated for, and 2) the signal is similar at the receiving end and at the transmitting end.

LIST OF DRAWINGS

Figure 2A:
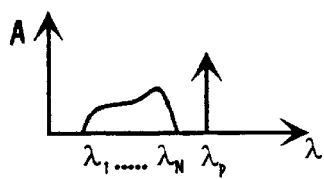
Figure 2B:
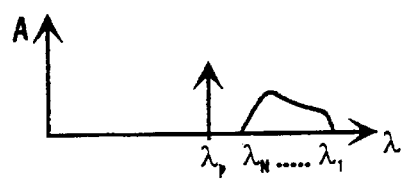

The invention will be described in greater detail in the following with reference to the accompanying schematic drawings, in which FIG. 1 illustrates the principle of an optical communication network realizing the dispersion compensation in accordance with the invention, FIG. 2a shows a signal spectrum before phase conjugation has been performed on the signal in phase conjugating means, FIG. 2b shows the signal spectrum after phase conjugation has been performed on the signal in the phase conjugating means.

DETAILED DESCRIPTION OF THE INVENTION

Let us examine the invention by means of FIG. 1. The ring network shown in the figure is constructed by means of optical fiber OF, network nodes NODE1–NODE5, and optical phase conjugating means OPC1–OPC15. The wavelengths used in the optical fiber can be e.g. in the wave range 1530 nm–1560 nm, which is currently the wavelength range typically used in optical communication. The drawings and the explanation pertaining thereto are only intended to illustrate the idea of the invention. In a practical implementation, the number of nodes and of phase conjugating means may naturally vary. The invention is based on the idea of routing the signals in such a way that there is an even number of phase conjugating means in the route of each signal, from the transmitting node to the receiving node. For example in a ring-shaped network, the invention can be advantageously applied in such a way that the network comprises two concentric optical rings, so that both rings include every node stated above. The phase conjugating means are operatively connected to said optical rings in such a way that in each case, two phase conjugating means are provided between each pair of adjacent nodes in the outer ring, whereas in the inner ring one phase conjugating means is provided between each pair of adjacent nodes. This being the case, the inner ring has an odd number of phase conjugating means between each pair of nodes, and the outer ring has an even number of phase conjugating means between each pair of nodes. The phase conjugating means are placed in the optical fiber in such a way that the distances between the phase conjugating means and between the nodes are equal, and furthermore the phase conjugating means provided in the outer ring are substantially at equal distance from the central point of the optical fiber connecting adjacent nodes, thus allowing complete dispersion compensation to be performed on the transmitted signal.

Let us presume that a signal comprising different wavelengths $\lambda_1, \ldots, \lambda_n$ is transmitted from NODE1 as shown in FIG. 1 to NODE2 in such a way that the signal passes through optical phase conjugating means OPC1. Let us further presume that wavelength $\lambda_1$ is the smallest and wavelength $\lambda_n$ the greatest. The phase conjugating means OPC1 inverts the signal spectrum, that is, performs a frequency shift on the wavelengths arriving at the device by mirroring them relative to a given mirror wavelength $\lambda_p$. Each wavelength that has passed through OPC1 is at an equal distance from the mirror wavelength $\lambda_p$ as upon arrival at OPC1, but on the reverse side of the mirror wavelength; this means that the signals are now in inverse order in the wavelength range. FIG. 2 illustrates the situation: FIG. 2a illustrates the situation before the arrival of the signal at the phase conjugating means OPC1 and FIG. 2b illustrates the situation in which the signal has passed through said device. The figure only depicts the signal spectrum reversal, and in this context it will not be discussed what the appearance of the signal will be after dispersion compensation. In this situation, the signal arrives at node NODE2 different from what it was at the transmitting node NODE1, in other words, low and high frequencies in the signal are in inverse order compared to the original signal.

Let us next consider a situation where the above signal is alternatively sent from node NODE1 to node NODE2 along a route in which the signal passes through two phase conjugating means OPC6 and OPC7. In this case, the signal spectrum is first mirrored to be inverse in phase conjugating means OPC6, and in phase conjugating means OPC7 the signal is re-mirrored relative the same mirror wavelength back to its original format. In other words, node NODE2 receives the signal transmitted from node NODE1 in exactly the same format as it had at the transmitting end. In addition to performing dispersion compensation on the signal with two phase conjugating means, using a suitable combination of the same equipment the signal can be transmitted in the correct format to the receiving node. Likewise, a signal to be transmitted from node NODE3 to node NODE1 could pass along the route NODE3–OPC3–NODE4–OPC4–NODE5–OPC14–OPC15–NODE1, for example. In such a case, the signal would pass through an even number of phase conjugating means. As can be easily seen from the figure, there are other alternative routes as well. Since every piece of equipment causes attenuation of the signal, it is preferable to route the signal in such a way that there is a minimum number of nodes and phase conjugating means along the signal route, yet so that the signal route comprises an even number of phase conjugating means. In other words, depending on the number of links a suitable route can be selected in such a way that the data traffic is directed to travel a route having an even number of dispersion compensation elements, i.e. such a route that the received spectrum corresponds to the transmitted spectrum. In such a case, the nodes need not pay attention to the order in which the wavelengths are to be detected. The routing is carried out by means of a centralized management system MS, keeping record of the routes of the different signals and controlling the switching elements in the nodes in such a way that the condition set on the even number of phase conjugating means is met. The management system can operate for example through a local interface (implementation shown by broken line in FIG. 1) or alternatively through the network. The additional attenuation caused by the phase conjugating means in the network is negligible. When necessary, optical amplifiers can be used.

In its details, the network in accordance with the invention, which is created for dispersion compensation, can vary within the scope of the claims. Even though the invention has been described in the foregoing in the context of a ring network, the solution can be used in other kinds of networks as well. Neither does the above specification consider what kind of equipment the network nodes contain, since this is not relevant to the invention. Other devices usually employed in connection with optical fibers, such as amplifiers, can naturally also be added to the fibers, when necessary. The phase conjugating means can be unidirectional or bidirectional. Furthermore, the window for the wavelength range for optical communication presented in the example can also be some other range, examples of such being the 1300 nm and 1700 nm wave range windows. The solution in accordance with the invention is an active method that can also be combined with other network elements, such as amplifiers.

What is claimed is:

1. A method for compensating signal dispersion with phase conjugating means in an optical communication network which comprises, in addition to the phase conjugating means, a plurality of telecommunications nodes and optical fibers connecting them, and in which communication network an optical signal comprising several optical signals having different wavelengths is transmitted on optical fiber, wherein in the communication network, the connections between the nodes are established via phase conjugating means in such a way that there is always at least one route between any two nodes in which the total number of phase conjugating means is even, and that the signal is routed from the transmitting node to the receiving node along a route in which the minimum even number of phase conjugating means is located, wherein at least two separate transmission links constituted by a first and a second optical fiber are used between two adjacent nodes to transport the signal between said nodes, one phase conjugating means is used on said first fiber and two phase conjugating means are used on said second fiber to compensate for the signal dispersion, the signal is routed from the transmitting terminal node to the receiving terminal node along an optical route in which the signal is subjected to phase conjugation observing the condition set on the total number of phase conjugating means, thus resulting in that the signal arrives at the receiving node substantially equivalent to what it was at the transmitting node.

2. A method as claimed in claim 1, wherein on said first fiber constituting an optical link, the phase conjugating means is located substantially halfway the fiber, and on said second fiber constituting an optical link, the phase conjugating means are located on each side of the central point of the fiber, at substantially equal distance from the central point of the fiber.

3. An optical communication network comprising a plurality of telecommunication nodes and optical fibers connecting them and a plurality of phase conjugating means for compensating the dispersion of an optical signal comprising several wavelengths to be transmitted in the communication network, wherein the connections between the nodes and the quantity of phase conjugating means on them are realized in such a way that there is always at least one route between any two nodes in which the total number of phase conjugating means is minimum even number, and wherein there are at least two separate transmission links constituted by optical fibers between two adjacent nodes in such a way that on a first fiber, one phase conjugating means is provided and on the second fiber, two phase conjugating means are provided to compensate for the signal dispersion.

4. An optical communication network as claimed in claim 3, wherein the network has the shape of a ring.

5. An optical communication network as claimed in claim 3, wherein the network comprises a centralized management system (MS) common to all nodes, attending to the routing of the signals from the transmitting terminal node to the receiving terminal node.

6. An optical communication network as claimed in claim 3, wherein, on the first fiber constituting an optical link, the phase conjugating means is located substantially halfway along the fiber, and on the second fiber constituting an optical link, the phase conjugating means are located on each side of the central point of the fiber, at substantially equal distance from the central point of the second fiber.

* * * * *

UNITED STATES PATENT AND TRADEMARK OFFICE
CERTIFICATE OF CORRECTION

PATENT NO. : 6,724,997 B2  Page 1 of 1
DATED : April 20, 2004
INVENTOR(S) : Oksanen It is certified that error appears in the above-identified patent and that said Letters Patent is hereby corrected as shown below:

<u>Title page,</u>
Item [30], Foreign Application Priority Data, should read as follows:
-- Mar. 12, 1999     (FI)…………………………..990547 --

Signed and Sealed this

Twenty-ninth Day of June, 2004

JON W. DUDAS
*Acting Director of the United States Patent and Trademark Office*